(12) United States Patent
Boutaghou et al.

(10) Patent No.: US 6,859,345 B2
(45) Date of Patent: Feb. 22, 2005

(54) BENDING MICROACTUATOR HAVING A TWO-PIECE SUSPENSION DESIGN

(75) Inventors: Zine-Eddine Boutaghou, Vadnais Heights, MN (US); Peter Crane, Richfield, MN (US); Markus E. Mangold, Eden Prairie, MN (US); Lee Walter, Plymouth, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/553,220

(22) Filed: Apr. 20, 2000

(65) Prior Publication Data

US 2003/0137777 A1 Jul. 24, 2003

Related U.S. Application Data

(60) Provisional application No. 60/149,530, filed on Aug. 17, 1999.

(51) Int. Cl.⁷ ................................................. G11B 5/56
(52) U.S. Cl. .................................................. 360/294.4
(58) Field of Search ........................ 360/294.4, 294.3, 360/294.1, 294.6, 104, 106

(56) References Cited

U.S. PATENT DOCUMENTS

| | | | |
|---|---|---|---|
| 4,310,913 A | | 1/1982 | Miller .......................... 369/43 |
| 4,374,402 A | * | 2/1983 | Blessom et al. .......... 360/266.2 |
| 4,996,623 A | | 2/1991 | Erpelding et al. ........... 360/104 |
| 5,103,361 A | | 4/1992 | Nagatsuka et al. .......... 360/109 |
| 5,189,578 A | | 2/1993 | Mori et al. ................... 360/106 |
| 5,364,742 A | * | 11/1994 | Fan et al. ....................... 216/48 |
| 5,682,076 A | | 10/1997 | Zumeris ....................... 310/323 |
| 5,745,319 A | * | 4/1998 | Takekado et al. ......... 360/78.05 |
| 5,793,571 A | | 8/1998 | Jurgenson et al. .......... 360/104 |
| 5,892,637 A | | 4/1999 | Brooks, Jr. et al. ......... 360/104 |
| 5,898,544 A | * | 4/1999 | Krinke et al. ................ 360/104 |
| 5,936,805 A | | 8/1999 | Imaino ........................ 360/104 |
| 6,038,104 A | * | 3/2000 | Sato et al. ................ 360/294.3 |
| 6,108,175 A | * | 8/2000 | Hawwa et al. ........... 360/294.4 |
| 6,215,629 B1 | * | 4/2001 | Kant et al. ................... 360/290 |
| 6,246,552 B1 | * | 6/2001 | Soeno et al. ............. 360/294.4 |
| 6,268,983 B1 | * | 7/2001 | Imada et al. ............. 360/294.3 |
| 6,297,936 B1 | * | 10/2001 | Kant et al. ............... 360/294.4 |
| 6,301,080 B1 | * | 10/2001 | Boutaghou .................. 360/255 |
| 6,327,120 B1 | * | 12/2001 | Koganezawa et al. ... 360/294.4 |
| 6,552,878 B2 | * | 4/2003 | Sato et al. ............... 360/294.4 |

FOREIGN PATENT DOCUMENTS

JP 09265738 * 10/1997

OTHER PUBLICATIONS

K. Mori, T. Munemoto, H. Otsuki, Y. Yamaguchi, K. Akagi; "A Dual–Stage Magnetic Disk Drive Actuator Using A Piezoelectric Device For A High Track Density"; (IEEE Transactions On Magnetics, vol. 27, No. 6, 11/91).
T. Imamura, S. Hasegawa, K. Takalshi, Y. Mizoshita; "Piezoelectric Microactuator Compensating for Off–Track Errors in Magnetic Disk Drives"; (Advances In Information Storage Systems, vol. 5, 1991).
Y. Tang, S.X. Chen, T.S. Low; "Micro Electrostatic Actuators In Dual–Stage Disk Drives With High Track Density" (IEEE Transactions On Magnetics, vol. 32, No. 5, 9/96).

* cited by examiner

*Primary Examiner*—Angel Castro
(74) *Attorney, Agent, or Firm*—Kinney & Lange, P.A.

(57) ABSTRACT

A microactuation system selectively alters a position of a transducing head carried by a slider in a disc drive system with respect to a track of a rotatable disk having a plurality of concentric tracks. The microactuation system includes a head suspension having a first portion and a flexure for supporting the slider. A flexible beam extends from the first portion of the head suspension at one end to the flexure at the other end. An electroactive element is attached to the beam. The electroactive element bends in response to a control signal applied thereto. The beam is sufficiently compliant to permit movement of the first portion of the head suspension with respect to the flexure.

16 Claims, 5 Drawing Sheets

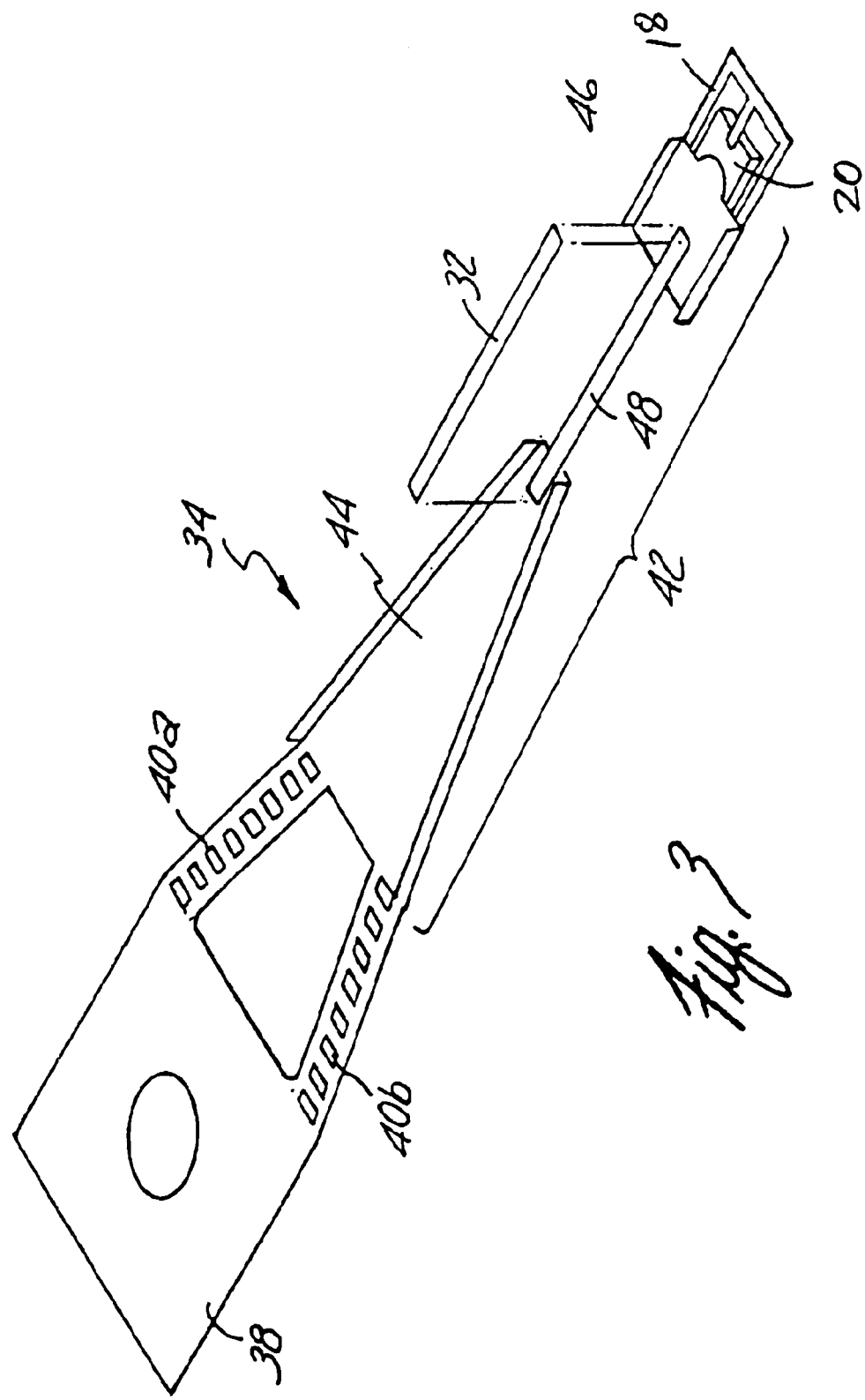

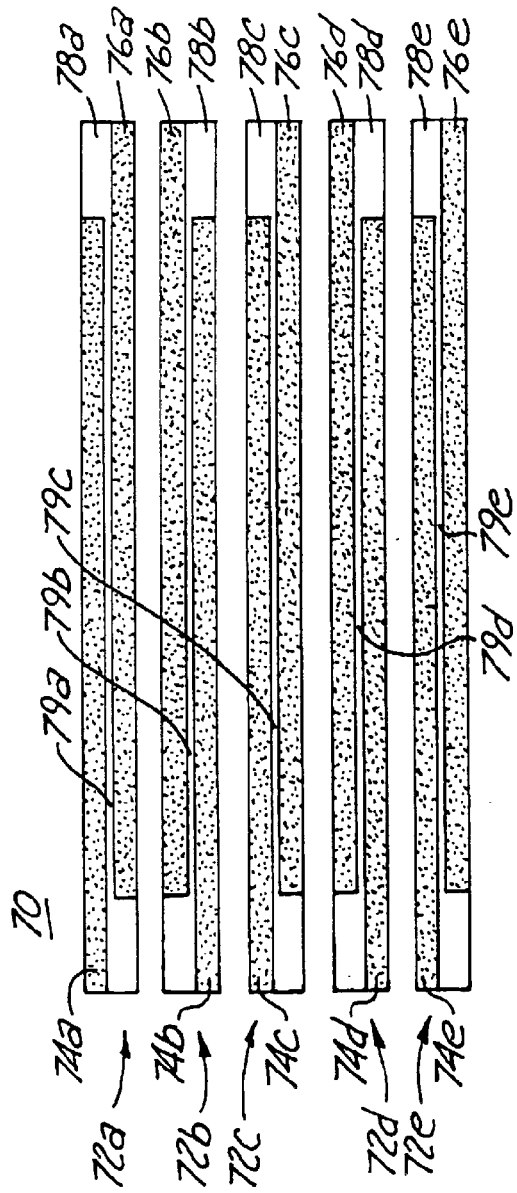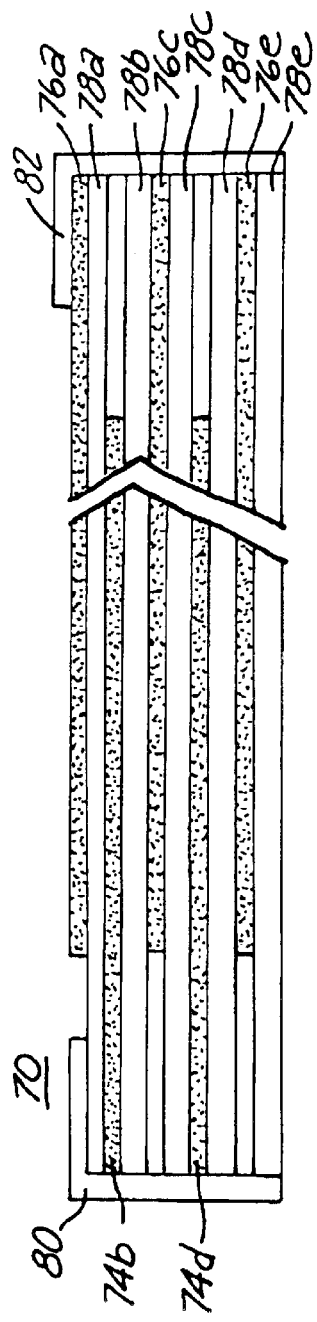

BENDING MICROACTUATOR HAVING A TWO-PIECE SUSPENSION DESIGN

CROSS-REFERENCE TO RELATED APPLICATION(S)

This application claims priority from provisional application No. 60/149,530, filed Aug. 17, 1999 for "Two Piece Suspension Design For PZT Slider Level Microactuator" by Zine-Eddine Boutaghou, Peter Crane, Markus E. Mangold, and Lee Walter.

BACKGROUND OF THE INVENTION

The present invention relates to a slider-level microactuator having an improved stroke length. More particularly, it relates to a microactuator located between a suspension and a slider in a disc drive system having an electroactive element to selectively move a transducing head radially with respect to a rotatable disc.

Disc drive systems include disc drive suspensions for supporting transducing heads over information tracks of a rotatable disc. Typically, suspensions include a load beam having a mounting region on a proximal end, a flexure on a distal end, a relatively rigid region adjacent to the flexure, and a spring region between the mounting region and the rigid region. An air bearing slider which holds the transducing head is mounted to the flexure. The mounting region is typically attached to a base plate for mounting the load beam to an actuator arm. A motor which is controlled by a servo control system rotates the actuator arm to position the transducing head over the desired information tracks on the disc. This type of suspension is used with both magnetic and non-magnetic discs.

The density of concentric data tracks on magnetic discs continues to increase (i.e., the size of data tracks and radial spacing between data tracks are decreasing), requiring more precise radial positioning of the head. Conventionally, head positioning is accomplished by operating an actuator arm with a large-scale actuation motor, such as a voice coil motor, to radially position a head on a slider at the end of the actuator arm. The large-scale motor lacks sufficient resolution to effectively accommodate high track-density discs. Thus, a high resolution head positioning mechanism, or microactuator, is necessary to accommodate the more densely spaced tracks.

One promising design for high resolution head positioning involves employing a high resolution microactuator in addition to the conventional low resolution actuator motor, thereby effecting head positioning through dual-stage actuation. Various microactuator designs have been considered to accomplish high resolution head positioning. These designs, however, all had shortcomings that limited the effectiveness of the microactuator. Many designs increased the complexity of designing and assembling the existing components of the disc drive, while other designs were unable to achieve the force and bandwidth necessary to accommodate rapid track access. Therefore, the prior designs did not present ideal microactuator solutions. More recent microactuator designs employ electroactive elements to effect movement of the suspension with respect to the actuator arm. This technique has proven effective but suffers from a small range of motion.

The positioning of a transducing head through dual-stage actuation using electroactive elements has been disclosed in prior patent applications. One such application is U.S. patent application Ser. No. 09/311,086 filed May 13, 1999 by Budde et al. entitled "PIEZOELECTRIC MICROACTUATOR SUSPENSION ASSEMBLY WITH IMPROVED STROKE LENGTH," which is assigned to Seagate Technology, Inc., the assignee of the present application and is hereby incorporated by reference. There remains a need in the art, however, for an electroactive element microactuator design that provides efficient high resolution head positioning in a dual-stage actuation system and allows for a greater range of motion than current designs.

BRIEF SUMMARY OF THE INVENTION

The present invention is a microactuator for selectively altering a position of a transducing head carried by a slider, in a disc drive system, with respect to a track of a rotatable disc having a plurality of concentric tracks. The disc drive system includes an actuator arm. The microactuator includes a load beam attached to a distal end of the actuator arm and a flexure for supporting the slider carrying the transducing head. A beam is attached between the load beam and the flexure, the beam being flexible to permit movement of the flexure with respect to the load beam in the general plane of the load beam. A bending motor is connected between the first section and the second section of the load beam, the bending motor disposed generally along a surface of the beam.

BRIEF DESCRIPTION OF THE DRAWINGS

FIG. 3 is an exploded perspective view of the microactuation system of FIG. 2A.

FIG. 5A is a top view of each of the layers of a multilayer bending motor according to a second embodiment of the present invention.

FIG. 5B is a side view of the multilayer bending motor of FIG. 5A.

DETAILED DESCRIPTION

Figure 1:
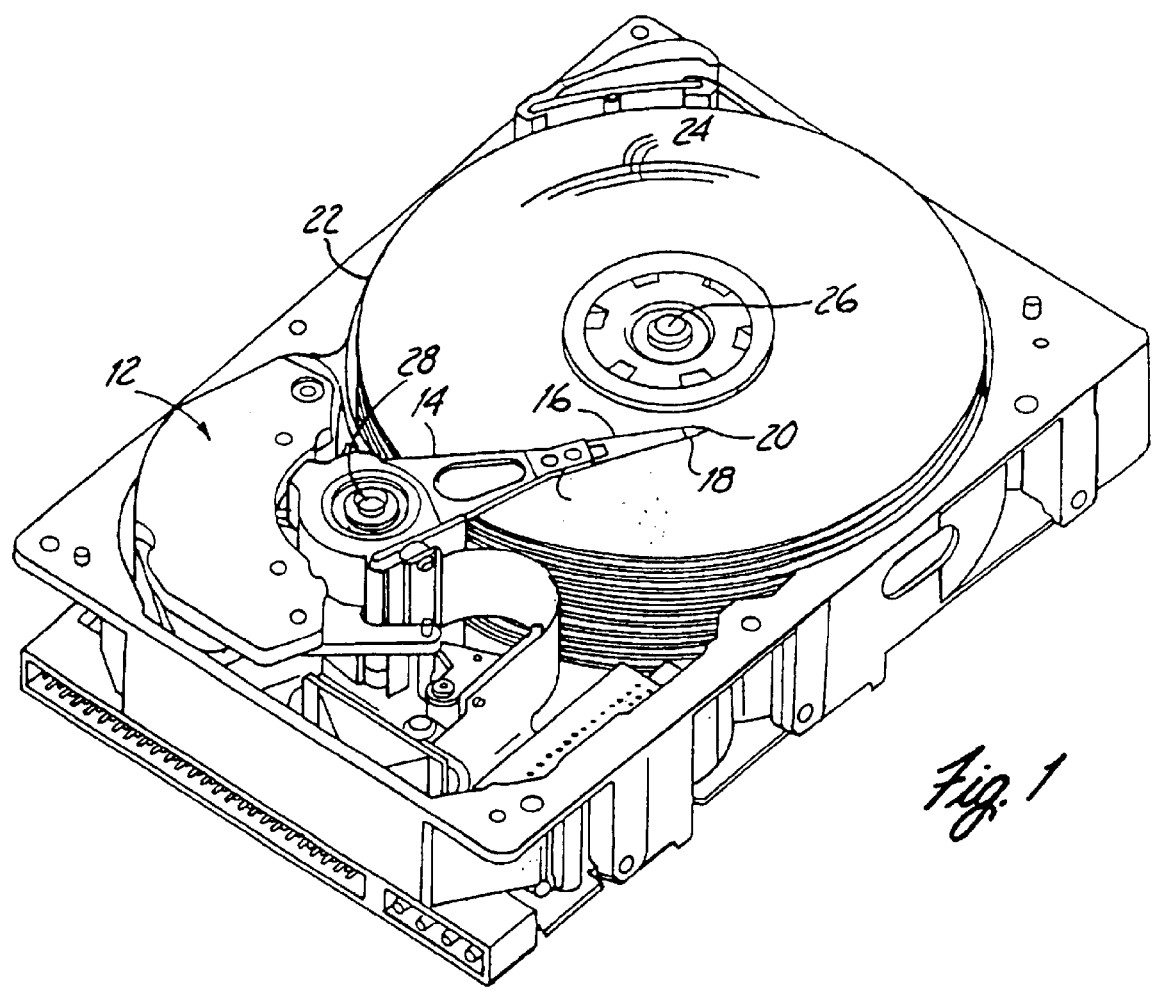
FIG. 1 is a perspective view of a disc drive system including a microactuation system for positioning a transducing head over selected tracks of a rotating disc.

FIG. 1 shows a top view of a disc drive actuation system 10, as known in the prior art, for positioning a transducing head (not shown) over a track of a magnetic disc. The actuation system 10 includes, as shown from left to right in FIG. 1, a voice coil motor (VCM) 12, an actuator arm 14, a suspension 16, a flexure 18, and a slider 20. The slider 20 is connected to the distal end of the suspension 16 by the flexure 18. The suspension 16 is connected to the actuator arm 14, which is coupled to the VCM 12.

As shown on the right side of FIG. 1, the disc drive assembly includes a disc 22 having a multiplicity of tracks 24 that rotate about an axis 26. During operation of the disc drive assembly, the rotation of the disc 22 generates air movement which is encountered by the slider 20. This air movement acts to keep the slider 20 aloft a small distance above the surface of the disc 22 allowing the slider 20 to "fly" above the surface of the disc 22. Any wear associated with physical contact between the slider 20 and the disc 22 is thus minimized.

The flexure 18 provides a spring connection between the slider 20 and the suspension 16. Flexure 18 is configured such that is allows the slider 20 to move in pitch and roll directions to compensate for fluctuations in the spinning surface of the disc 22. Many different types of flexures 18, also known as gimbals, are known to provide the spring connection allowing for pitch and roll movement of the slider 20 and can be used with the present invention.

The VCM 12 is selectively operated to move the actuator arm 14 around an axis 28 thereby moving the suspension 16 and positioning the transducing head (not shown) carried by the slider 20 between the tracks 24 of the disc 22. Proper positioning of the transducing head (not shown) is necessary for reading and writing of data on the concentric tracks 24 of the disc 22. For a disc 22 having a high density, however, the VCM 12 lacks sufficient resolution and frequency response to position the transducing head (not shown) on the slider 20 over a selected track 24 of the disc 22. Therefore, a higher resolution microactuation system is used in combination with the VCM 12.

Figure 2A:
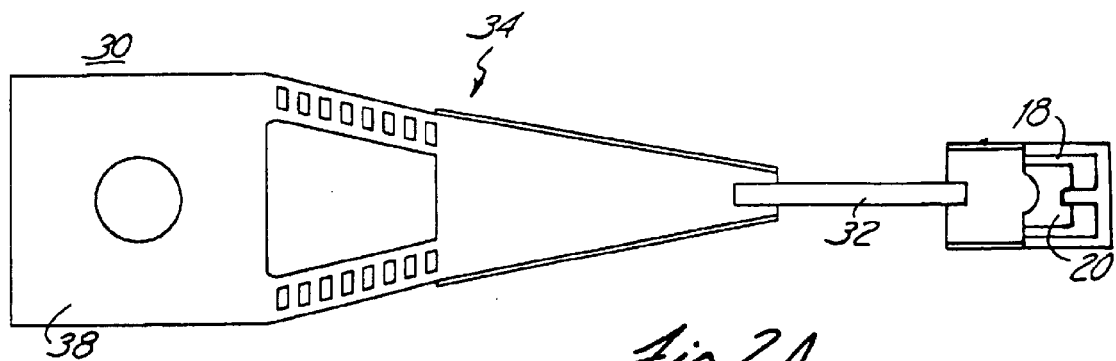
FIG. 2A is a top view of a microactuation system, shown in a neutral position, for use in a dual-stage disc drive actuation system for high resolution positioning of a transducing head according to the present invention.
Figure 2B:
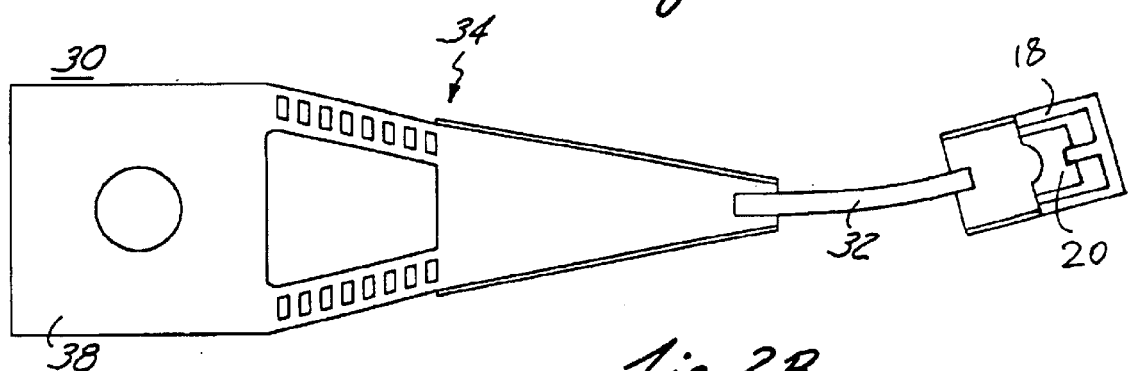
FIG. 2B is a top view of the microactuation system of FIG. 2A, shown in a first actuated position, for use in a dual-stage disc drive actuation system for high resolution positioning of a transducing head according to the present invention.
Figure 2C:
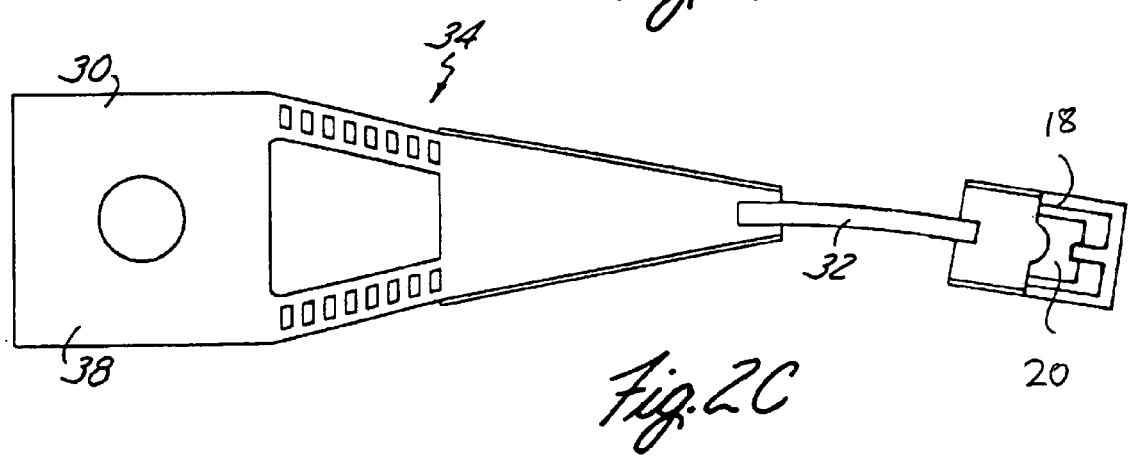
FIG. 2C is a top view of the microactuation system of FIG. 2A, shown in a second actuated position, for use in a dual-stage disc drive actuation system for high resolution positioning of a transducing head according to the present invention.

FIGS. 2A–2C show three top views of a microactuation system 30 for use in a dual-stage disc drive actuation system for high resolution positioning of a transducing head (not shown) according to the present invention. As shown from right to left in FIGS. 2A–2C, the microactuation system 30 includes a bending motor 32 and a load beam 34. A mounting region 38 of the load beam 34 connects to a base plate (not shown), which connects to the actuator arm 14. The bending motor 32, the load beam 34, and the base plate are all components of the suspension 16 (as shown in FIG. 1). As shown on the far right side in FIGS. 2A–2C, the distal end of the load beam 34 is coupled to the flexure 18, which holds the slider 20.

FIGS. 2A–2C, when viewed together, illustrate the general operation of the microactuation system 30 of the present invention. FIG. 2A shows the microactuation system 30 in a neutral position. As is apparent from FIG. 2A, in the neutral position the bending motor 32 is generally straight along its longitudinal axis. FIG. 2B shows the microactuation system 30 in a first actuated position in which the bending motor 32 is curved or bent to the left of the neutral position. FIG. 2C shown the microactuation system 30 in a second actuated position in which the bending motor 32 is curved or bent to the right of the neutral position. The amount of displacement of the slider 20 shown in FIG. 2B and FIG. 2C is exaggerated for purposes of illustration. The bending of the bending motor 32 operates to cause a displacement of the slider 20 and thus the transducing head (not shown), which in turn causes an adjustment of the position of the transducing head (not shown) with respect to a selected track 24 of the disc 22.

FIG. 3 shows an exploded perspective view of the microactuation system 30 of the present invention. As shown in FIG. 3, moving from left to right, or from a proximal end to a distal end, the load beam 34 includes a mounting region 38, two pre-load bend legs 40a, 40b, and a head suspension 42. The head suspension 42 is flexibly coupled to the mounting region 38 by the two pre-load bend legs 40a, 40b. The head suspension 42 includes a proximal section 44 and a distal section 46. The distal section 46 is connected to the proximal section 44 by a flexible beam 48. The distal section 46 of the head suspension 42 supports the flexure 18, which supports the slider 20, which supports the transducing head (not shown).

As further shown in FIG. 3, the bending motor 32 is mounted to a top surface of the flexible beam 48 disposed in a plane generally parallel to the plane of the head suspension 42. In a first embodiment, the bending motor 32 is mounted to the flexible beam 48 using an adhesive. The bending motor 32 can also be mechanically fastened to the flexible beam 48. The fastening of the bending motor 32 to the flexible beam 48 is described in greater detail below with reference to FIG. 4B.

The bending motor 32 is a structural element operable as a bendable cantilever to alter the position of the distal section 46 with respect to the proximal section 44 of the head suspension 42 (as illustrated by the sequence of FIGS. 2A–2C). By causing rotation and displacement of the distal section 46 of the head suspension 42, the bending motor 32 effects high resolution positioning of the transducing head (not shown) carried by the slider 20. In a preferred embodiment, the bending motor 32 is constructed from an electroactive material such as piezoelectrics, electroactive ceramics, electroactive polymers, or electrostrictive ceramics. In another preferred embodiment, the bending motor 32 is constructed from thermoactive elements. The remainder of this disclosure will describe the preferred embodiment of the present invention employing piezoelectric elements such as zinc oxide (ZnO), lead zirconate titanate ($PbZrTiO_3$, also known as PZT), aluminum nitride (AlN), or polyvinylidene fluoride (PVDF).

During operation, the head suspension 42 is subjected to various shock loads by the spinning of the disc 22. These loads are transmitted from the slider 20 to the distal portion 46 of the head suspension 42 through the flexure 18. The loads are then further transmitted from the distal portion 46 to the proximal portion 44 of the head suspension 42 through the bending motor 32 and the flexible beam 48. The load beam 34 design of the present invention, while allowing for the achievement of excellent head displacements, introduces concerns about the structural integrity of the bending motor 32 when exposed to these shock loads during operation. Piezoelectric elements, in general, tend to withstand compressive loads much better than tensile loads. The first embodiment of the present invention, therefore, is designed to insure that shock loads experienced by the slider create compressive loads in the bending motor 32. This is accomplished through the use of the flexible beam 48. The bending motor 32 is attached to the top of the flexible beam 48, which has a thickness approximately equal to that of the bending motor 32. Thus when bending of the composite structure in an upward direction (away from the disc 22) occurs, the bending motor 32 is subjected to a compressive load and the flexible beam 48 is subjected to a tensile load. In some cases, it may be advantageous to expose the bending motor 32 to a tensile load. In this case, in a second embodiment of the present invention, the bending motor 32 is attached to the bottom of the flexible beam 48. In a third embodiment of the present invention, the flexible beam 48 is not employed. Instead, the bending motor 32 acts as both the structural member for connecting the proximal section 44 to the distal section 46 and the actuating element.

In an alternative embodiment, the head suspension 42 does not include a proximal section 44 and a distal section 46. Instead, the flexible beam 48 connects the head suspension 42 directly to the flexure 18, and the bending motor 32 is attached to the flexible beam 48. In this embodiment, the head suspension 42 (shown in FIG. 3) would consist only of the proximal section 44 (shown in FIG. 3), not the distal section 46.

Figure 4A:
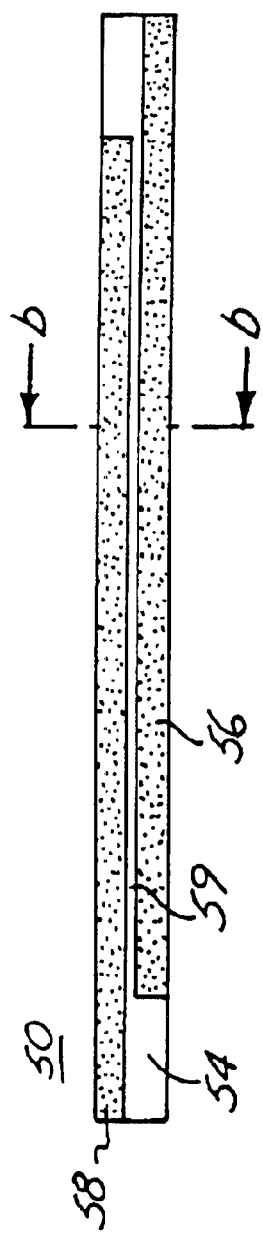
FIG. 4A is a top view of a bending motor according to a first embodiment of the present invention.
Figure 4B:
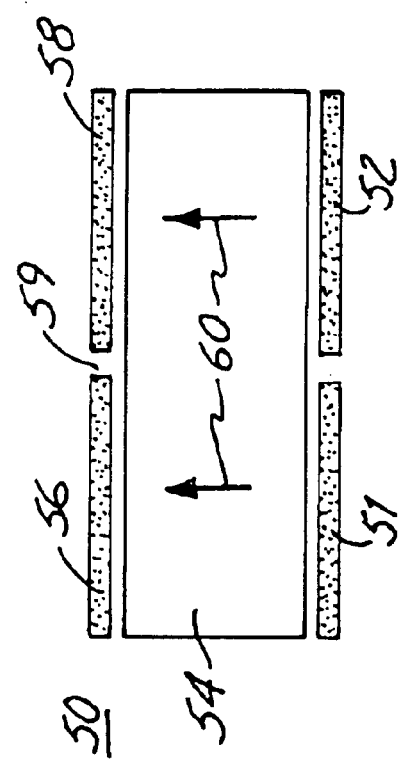
FIG. 4B is a sectional view of the bending motor of FIG. 4A taken along the line b—b.

FIGS. 4A and 4B show a top view and a sectional view of a unimorph bending motor 50, which represents a first preferred embodiment of the bending motor 32 described with reference to FIG. 3. The unimorph bending motor 50 operates using a "differential" approach as further explained below. As best shown in FIG. 4B, which is a sectional view taken along the line b—b in FIG. 4A, the unimorph bending motor 50 includes a first bottom electrode 51, a second bottom electrode 52, a piezoelectric element 54, a first top electrode 56, and a second top electrode 58. The first top electrode 56 is deposited over the top surface of one longitudinal half of the piezoelectric element 54, and the second top electrode 58 is placed over the other longitudinal half of the piezoelectric element 54. The entire piezoelectric element 54 is poled in the direction of the arrows 60.

As best shown in FIG. 4A, the first top electrode 56 is disposed longitudinally over slightly less than one transverse half of the piezoelectric element 54 and extends along about eighty-five percent of the length of the piezoelectric element 54, initiating near a right side. The second top electrode 58 is also disposed longitudinally over slightly less than one transverse half of the piezoelectric element 54. The second top electrode 58, however, initiates near a left side and extends along about eighty-five percent of the length of the piezoelectric element 54. As also best shown in FIG. 4A, the first top electrode 56 and the second top electrode 58 are separated by a space or gap 59. The bottom electrodes 51, 52 are arranged much like the top electrodes 56, 58. The first bottom electrode is disposed longitudinally over slightly less than one transverse half of the piezoelectric element 54, but it initiates near a left side (of FIG. 4). The second bottom electrode is disposed longitudinally over slightly less than one transverse half of the piezoelectric element 54, initiating near a right side (of FIG. 4).

During operation, an electric potential is applied to the bottom electrodes 51, 52 and the top electrodes 56, 58. The potential difference between the bottom electrodes 51, 52 and the top electrodes 56, 58 causes expansion or contraction of the portion of the piezoelectric element 54 located between the respective top electrode and the bottom electrode. For example, if a positive voltage is applied to the first top electrode 56 and a negative voltage is applied to the first bottom electrode 51, the portion of the piezoelectric element 54 located between these electrodes 51, 56 will contract in the direction normal to the electrodes 51, 56, which, according to the Poisson's Ratio of the material, will cause that portion to expand longitudinally (in the direction parallel to the electrodes 51, 56). At the same time, a negative voltage is applied to the second top electrode 58 and the second bottom electrode 52, which causes the portion of the piezoelectric element 54 located between these electrodes to contract longitudinally.

In an alternative embodiment, only one bottom electrode is employed. The bottom electrode is connected to electrical ground, and the driving voltage is applied to the top electrodes 56, 58. In this embodiment, however voltages of twice the magnitude must be applied to the top electrodes 56, 58 to achieve the same effect.

The expansion of the first portion and the concurrent contraction of the second portion generates a bending moment in the piezoelectric element 54. This moment results in a bending motion of the unimorph bending motor 50, which will effect rotation and displacement of the distal section 46 with respect to the proximal section 44 of the head suspension 42. This rotation and displacement of the distal section 46 will, in turn, cause movement of the transducing head carried by the slider 20. The amount of bending of the unimorph bending motor 50, and thus the amount of displacement of the transducing head, is precisely controlled by the magnitude of the voltages applied to the electrodes 51, 52, 56, 58. The direction of the bending motion is controlled by the polarity of the voltages applied to the first top electrode 56 and the second top electrode 58.

In a second preferred embodiment of the present invention, the bending motor 32 is constructed using an oppositely poled piece of electric piezoelectric element. In this embodiment, the piezoelectric element is poled in one direction on a first longitudinal half and is poled in the opposite direction on the other longitudinal half. In this embodiment, only a single top electrode and a single bottom electrode are necessary for operation. The bending motion results from the opposite effect of the electric field on each half of the piezoelectric element. This oppositely poled piezoelectric element embodiment is further discussed in U.S. patent application Ser. No. 09/553,523, filed on Apr. 20, 2000 by Murphy, Budde, Mangold, and Crane entitled "IN-PLANE SUSPENSION-LEVEL BENDING MICRO-ACTUATOR FOR PRECISE HEAD POSITIONING," which is assigned to Seagate Technology Inc., the assignee of the present invention, and is hereby incorporated by reference.

The amount of displacement or stroke of the transducing head from a neutral position can be calculated using the following equation:

$$\text{Stroke} = \left(\frac{L}{2} + X\right)\left(\frac{2 \cdot V \cdot d_{31} \cdot L}{S \cdot t}\right)$$

where L is the active length of the piezoelectric element, X is the distance from the distal active end to the transducing head, V is the driving voltage or electric potential, $d_{31}$ is the piezoelectric constant of the material, S is the spacing between electrode centers, and t is the thickness of the piezoelectric layer subjected to the electric field. As is apparent from this equation, one way to increase the stroke of the bending motor 32 is to increase the length to width ratio. In one embodiment of the present invention, the length to width ratio of the bending motor 32 is at least ten to one. This results in an increased stroke capability.

FIGS. 5A and 5B show a parade top view and a side view, respectively, of a multilayer bending motor 70 according to a second preferred embodiment of the bending motor 32. FIG. 5A is oriented such that the proximal end of the multilayer bending motor 70 is shown near the left side and the distal end of the multilayer bending motor 70 is shown near the right side. The thicknesses in FIG. 5B are exaggerated (not proportional to the widths shown in FIG. 5A) for ease of illustration. As shown in FIG. 5A, the multilayer bending motor 70 includes a first layer 72a, a second layer 72b, a third layer 72c, a fourth layer 72d, and a fifth layer 72e. As best shown in FIG. 5B, each of the layers are stacked one layer on top of the next such that the first layer 72a is on top and the fifth layer 72e is on bottom. The use of a multilayer device provides the advantages of a greater actuation force. Using the multilayer bending motor 70, a greater displacement of the transducing head may be achieved with the same voltage as in a comparable single-layer device. Alternatively, the same displacement of the transducing head may be achieved using lower voltage levels than in a comparable single-layer device. A single-layer device, however, also offers advantages. For example, a single-layer device is less expensive and occupies less physical space. The preferred number of layers will vary depending upon the particular application and desired results.

As best shown in FIG. 5A each of the layers 72a, 72b, 72c, 72d, 72e include two electrodes on a top surface disposed in a staggered configuration with one electrode positioned near each end of a piezoelectric element. This configuration allows each electrode on a given layer to be coupled to a separate control signal for causing activation of the piezoelectric element as discussed in greater detail below.

As best shown in FIG. 5A, the first layer 72a includes a positive electrode 74a, a negative electrode 76a, and a piezoelectric element 78a. The positive electrode 74a and negative electrode 76a are disposed on a top surface of the piezoelectric element 78a. The positive electrode 74a is disposed longitudinally over slightly less than one transverse half of the piezoelectric element 78a and extends along about eighty-five percent of the length of the piezoelectric element 78a, initiating near a proximal end (the left side as shown in FIG. 5A). The negative electrode 76a is disposed longitudinally over slightly less than one transverse half of the piezoelectric element 78a and extends along about eighty-five percent of the length of the piezoelectric element 78a, ending near the distal end (the right side as shown in FIG. 5A). As also best shown in FIG. 5A, the positive electrode 74a and the negative electrode 76a are separated by a space or gap 79a. As shown in FIG. 5B, the negative electrode 76a of the first layer 72a is disposed near the right side of the multilayer bending motor 70.

As best shown in FIG. 5A, the second layer 72b includes a positive electrode 74b, a negative electrode 76b, and a piezoelectric element 78b. The positive electrode 74b and negative electrode 76b are disposed on a top surface of the piezoelectric element 78b. The positive electrode 74b is disposed longitudinally over slightly less than one transverse half of the piezoelectric element 78b and extends along about eighty-five percent of the length of the piezoelectric element 78b, initiating near a proximal end (the left side as shown in FIG. 5A). The negative electrode 76b is disposed longitudinally over slightly less than one transverse half of the piezoelectric element 78b and extends along about eighty-five percent of the length of the piezoelectric element 78b, ending near the distal end (the right side as shown in FIG. 5A). As also best shown in FIG. 5A, the positive electrode 74b and the negative electrode 76b are separated by a space or gap 79b. As shown in FIG. 5B, the positive electrode 74b of the second layer 72b is disposed near the right side of the multilayer bending motor 70. The positive electrode 74b and the negative electrode 76b also act as the bottom electrodes for the first layer 72a.

As best shown in FIG. 5A, the third layer 72c includes a positive electrode 74c, a negative electrode 76c, and a piezoelectric element 78c. The positive electrode 74c and negative electrode 76c are disposed on a top surface of the piezoelectric element 78c. The positive electrode 74c is disposed longitudinally over slightly less than one transverse half of the piezoelectric element 78c and extends along about eighty-five percent of the length of the piezoelectric element 78c, initiating near a proximal end (the left side as shown in FIG. 5A). The negative electrode 76c is disposed longitudinally over slightly less than one transverse half of the piezoelectric element 78c and extends along about eighty-five percent of the length of the piezoelectric element 78c, ending near the distal end (the right side as shown in FIG. 5A). As also best shown in FIG. 5A, the positive electrode 74c and the negative electrode 76c are separated by a space or gap 79c. As shown in FIG. 5B, the negative electrode 76c of the third layer 72c is disposed near the right side of the multilayer bending motor 70. The positive electrode 74c and the negative electrode 76c also act as the bottom electrodes for the second layer 72b.

As best shown in FIG. 5A, the fourth layer 72d includes a positive electrode 74d, a negative electrode 76d, and a piezoelectric element 78d. The positive electrode 74d and negative electrode 76d are disposed on a top surface of the piezoelectric element 78d. The positive electrode 74d is disposed longitudinally over slightly less than one transverse half of the piezoelectric element 78d and extends along about eighty-five percent of the length of the piezoelectric element 78d, initiating near a proximal end (the left side as shown in FIG. 5A). The negative electrode 76d is disposed longitudinally over slightly less than one transverse half of the piezoelectric element 78d and extends along about eighty-five percent of the length of the piezoelectric element 78d, ending near the distal end (the right side as shown in FIG. 5A). As also best shown in FIG. 5A, the positive electrode 74d and the negative electrode 76d are separated by a space or gap 79d. As shown in FIG. 5B, the positive electrode 74d of the fourth layer 72d is disposed near the right side of the multilayer bending motor 70. The positive electrode 74d and the negative electrode 76d also act as the bottom electrodes for the third layer 72c.

As best shown in FIG. 5A, the fifth layer 72e includes a positive electrode 74e, a negative electrode 76e, and a piezoelectric element 78e. The positive electrode 74e and negative electrode 76e are disposed on a top surface of the piezoelectric element 78e. The positive electrode 74e is disposed longitudinally over slightly less than one transverse half of the piezoelectric element 78e and extends along about eighty-five percent of the length of the piezoelectric element 78e, initiating near a proximal end (the left side as shown in FIG. 5A). The negative electrode 76e is disposed longitudinally over slightly less than one transverse half of the piezoelectric element 78e and extends along about eighty-five percent of the length of the piezoelectric element 78e, ending near the distal end (the right side as shown in FIG. 5A). As also best shown in FIG. 5A, the positive electrode 74e and the negative electrode 76e are separated by a space or gap 79e. As shown in FIG. 5B, the negative electrode 76e of the fifth layer 72e is disposed near the right side of the multilayer bending motor 70. The positive electrode 74e and the negative electrode 76e also act as the bottom electrodes for the fourth layer 72d.

The multilayer bending motor 70 is constructed by placing each of the layers 72a, 72b, 72c, 72d, 72e on top of one another. As is shown in FIG. 5B, each of the first four piezoelectric elements 78a, 78b, 78c, 78d are subjected to opposite polarity voltages (74 representing a positive electrode and 76 representing a negative electrode) on each side of a longitudinal centerline. This configuration allows the multilayer bending motor 70 to be actuated in a bending fashion as further described below. The fifth piezoelectric element 78e is not subjected to the same electric potential as the first four elements because it does not have electrodes on a bottom surface. The principal purpose of the fifth piezoelectric element 78e is to act as an insulator between the multilayer bending motor 70 and the flexible beam 48 (and thus the head suspension 42).

As shown in FIG. 5B, once the layers 72a, 72b, 72c, 72d, 72e are placed on top of one another, a positive endcap 80 is placed over the distal end (the left side as shown in FIG. 5B) of the multilayer bending motor 70, and a negative endcap 82 is placed over the proximal end (the right side as shown in FIG. 5B) of the multilayer bending motor 70. In a first preferred embodiment, the endcaps 80, 82 are placed using a metal organic chemical vapor deposition (MOCVD) technique. In a second preferred embodiment, the endcaps 80, 82 are placed using metal paste ink as known in the art. Once in place, the positive endcap 80 makes electrical contact with each of the positive electrodes 74a, 74b, 74c, 74d, 74e, and the negative endcap 82 make electrical contact with each of the negative electrodes 76a, 76b, 76c, 76d, 76e.

During operation, a first control signal is applied to the positive endcap 80, and a second control signal is applied to the negative endcap 82. Generally, a positive voltage is applied to the positive endcap 80, and a negative voltage is applied to the negative endcap 82. The applied voltages create an electric potential difference between each corresponding pair of positive electrodes 74a, 74b, 74c, 74d, 74e and negative electrodes 76a, 76b, 76c, 76d, 76e, which acts upon each of the piezoelectric elements 78a, 78b, 78c, 78d, 78e to cause expansion or contraction of the corresponding portion of that element. This voltage application will cause one half of each piezoelectric element 78a, 78b, 78c, 78d, 78e to contract longitudinally and the other half to expand longitudinally (in the direction parallel to the electrodes).

The expansion of the first portion and the concurrent contraction of the second portion generates a bending moment in each of the piezoelectric elements 78a, 78b, 78c, 78d, 78e. This moment results in a bending motion of the multilayer bending motor 70, which will effect rotation and displacement of the distal section 46 with respect to the proximal section 44 of the head suspension 42. This rotation and displacement of the distal section 46 will, in turn, cause movement of the transducing head carried by the slider 20. The amount of bending of the multilayer bending motor 70, and thus the amount of displacement of the transducing head, is precisely controlled by the magnitude of the voltages applied to the endcaps 80, 82. The direction of the bending motion is controlled by the polarity of the voltages applied to the positive endcap 80 and the negative endcap 82.

The present invention provides precise, high performance head positioning with high acceleration in moving the head. It provides sufficiently large and accurate head displacement or stroke to cover numerous data tracks. The present invention also allows for the control of resonance modes of the suspension.

During operation of the disc drive actuation system 10, the head suspension 42 is subjected to a variety of excitation forces. These forces can negatively impact the performance of the read/write head by causing undesirable vibrations of the head suspension 42. Some vibration of interest include out-of-plane, torsional, and in-plane. The out-of-plane vibrations are commonly caused by the force applied to the head by the windage generated by the spinning of the surface of the disc 22. The vibrations can become especially problematic when the excitation frequency approaches the first bending mode or the second bending mode of the head suspension 42. At these frequencies, the head suspension 42 may begin to resonate causing unacceptable out-of-plane displacement of the head suspension. It is desirable, therefore, to design the head suspension 42 such that the first bending mode and second bending mode frequencies are high. Torsional vibration of the head suspension 42 may be caused by the combination of coarse and fine actuation activities. Torsion or twisting of the head suspension 42 can affect both the track positioning and the height of the head. Finally, the excitation of the head suspension 42 by both the coarse and fine actuation (causing acceleration and deceleration of the head) can cause in-plane vibrations.

In-plane vibration of the head suspension 42 can be problematic because it introduces track misregistration, which is defined as the offset distance between the center of the read head and the center of the written track. Track misregistration may result in errors when reading data from the disc 22. The in-plane resonance frequency of the head suspension 42 is commonly referred to as the microactuator mode. Two techniques may be employed to control problems associated with in-plane vibration. The first technique is to design the head suspension 42 to have a microactuator mode at a low enough frequency to fall within the bandwidth of the disc drive's servo control system. In this case, the track misregistration effects of the vibrations may be counteracted by the servo control system using the error data received from the disc servo pattern. The second technique is to design the head suspension 42 to have a microactuator mode at a sufficiently high frequency that resonance is not a concern.

The design of the present invention allows for a variation in the frequency of the microactuator mode. Only the distal portion 46 (if present), the flexure 18, and the slider 20 are moved by the bending motor 32, which minimizes the total mass that is displaced and thereby enables high acceleration of the head. Additionally, moving only the distal portion 46 of the head suspension 42 discounts the resonance effects of the actuator arm 14 and the remainder of the load beam 34, eliminating any track misregistration effects due to vibrations resulting from vibration of these components.

The suspension design of the present invention also allows for higher out-of-plane resonance frequencies than those of prior art suspension designs, which results in decreased track positioning error. The out-of-plane resonance frequency of the load beam 34 of the present invention can be easily adjusted. The out-of-plane resonance frequency is adjusted by placing creases in selected locations of the pre-load bend legs 40a and 40b. Using this technique, a load beam that has a first mode out-of-plane resonance frequency of greater than about two kilohertz and a second mode out-of-plane resonance frequency of greater than about six kilohertz may be created. These out-of-plane resonance frequencies may be further increased by increasing the thickness of the load beam.

A further aspect of the present invention is a process for fabricating the bending motor 32. Initially, the piezoelectric material is mixed and then oven dried until a workable slurry is formed. This green piezoelectric material is then thinly spread on a laminate. Next, the electrode structures, typically platinum/titanium or palladium/titanium, are applied, in appropriate locations, on green sheets of piezoelectric material. The electrode structures are typically applied using a painting, spinning, or screen printing technique and patterned as generally known in the art. The sheets of piezoelectric material, with applied electrodes, are then stacked on top of one another until the desired number of layers (five in an illustrative embodiment shown in FIGS. 5A and 5B) are present to form an array. This array is then aligned using techniques known in the art.

The array is then baked, typically at 500 to 700° C., and then fired or heated in a kiln at typically 800 to 1500° C. The baking cycle decomposes and drives off the organic substances in the slurry leaving only the ceramic piezoelectric material and the metal electrodes. The firing process converts the piezoelectric material into a perovskite phase, and causes the electrodes to diffuse into the piezoelectric material and reduce in thickness. The piezoelectric material is then poled by exposing it to an electromagnetic field while at an elevated temperature. Poling of the piezoelectric material may also be performed after the dicing process described below. After the array is fired, a first dicing pass is made to define the length of the bending motor 32. At this stage of the process, the length of the bending motor 32 has been defined, but the width remains uncut so several bending motors 32 remain in the wafer.

At this point, the endcaps 80, 82 are applied to the ends in a configuration perpendicular to the electrodes. The endcaps 80, 82 are applied along the edge and partially along the top surface of the wafer, such that the endcaps 80, 82 make contact with the electrodes located near the end of its application. In a first preferred embodiment, the endcaps 80, 82 are applied by metal organic chemical vapor deposition (MOCVD), a method generally known to those of ordinary skill in the art. MOCVD allows the endcaps 80, 82 to be applied to the wafer at a low temperature, which prevents the application process from interfering with the properties of the piezoelectric material. MOCVD offers the further advantage of conformability. In other words, MOCVD allows the application of the endcaps 80, 82 in a manner that closely follows the topography of the surface of the piezoelectric elements and fills in any cracks or gaps. This allows the deposited metal to make contact with the inner electrodes positioned near the end of application. Typically, the endcaps 80, 82 are constructed from platinum, palladium, or gold, because or their non-corrosive properties.

After application of the endcaps 80, 82, a second dicing pass is made to singulate each individual bending motor 32 from the wafer. This second dicing pass actually cuts through the metal endcaps 80, 82, which may result in a smearing of the endcaps 80, 82. To prevent this smearing of the endcaps 80, 82 from causing contact with an opposed electrode, the electrodes are positioned a small distance from the edge of the bending motor 32. In a preferred embodiment, the electrodes are positioned about fifteen microns from the edge.

The fabrication process of the present invention allows inexpensive and efficient production of the bending motors 32 by allowing the electrodes and endcap terminals to be applied to large wafers of piezoelectric material. The process disclosed further results in highly effective bending motors 32, because the piezoelectric material retains its poling. Additionally, the process allows for the manufacture of piezoelectric material layers having far thinner thicknesses than those of the prior art.

Although the present invention has been described with reference to preferred embodiments, workers skilled in the art will recognize that changes may be made in form and detail without departing from the spirit and scope of the invention.

What is claimed is:

1. A microactuation system comprising:
   a load beam having a stationary region and a moving region;
   means for flexibly coupling the stationary region of the load beam to the moving region of the load beam; and
   means for selectively altering a position of a slider, the means for selectively altering mounted to the means for flexibly coupling and the means for selectively altering extending from a distal end of the stationary region to a proximal end of the moving region generally along a longitudinal centerline of the stationary region.

2. A microactuation system comprising:
   a load beam having a first section;
   a flexure for supporting a slider carrying a transducing head;
   a bending motor attached between the first section of the load beam and the flexure, the bending motor being deformable in response to a control signal applied thereto; and
   a flexible beam having a first end and a second end the first end being connected to the first section of the load beam and the second end being connected to the flexure wherein the bending motor is attached to the flexible beam.

3. The microactuation system of claim 2 wherein the bending motor is attached to a top surface of the flexible beam such that the flexible beam supports the bending motor and transforms a force on the flexure into a compressive load on the bending motor.

4. The microactuation system of claim 3 wherein the bending motor is constructed from a member of the group consisting of a piezoelectric material, an electroactive ceramic, an electroactive polymer, and an electrostrictive ceramic material.

5. The microactuation system of claim 2 wherein the load beam has a second section connected to the flexure, and further wherein the flexible beam is connected between the first section and the second section of the load beam.

6. The microactuation system of claim 2 wherein the bending motor comprises:
   a bottom electrode;
   an electroactive material on top of the bottom electrode, the electroactive material constructed such that it has two portions poled in opposite directions; and
   a top electrode on top of the electroactive material;
   wherein the electroactive material bends in plane in response to control signals supplied to the bottom electrode and the top electrode.

7. The microactuation system of claim 6 wherein the electroactive material is constructed from a member of the group consisting of a piezoelectric material, an electroactive ceramic, an electroactive polymer, and an electrostrictive ceramic material.

8. The microactuation system of claim 2 wherein the bending motor comprises:
   a bottom electrode;
   an electroactive material on top of the bottom electrode, the electroactive material uniformly poled;
   a first top electrode disposed on top of a first longitudinal half of the electroactive material; and
   a second top electrode disposed on top of a second longitudinal half of the electroactive material;
   wherein the electroactive material bends in plane in response to control signals supplied to the bottom electrode and the first and second top electrodes.

9. The microactuation system of claim 2 wherein the bending motor comprises:
   a bottom electrode;
   a first electroactive element on the bottom electrode;
   a shared electrode on the first electroactive element;
   a second electroactive element on the shared electrode; and
   a top electrode on the second electroactive element.

10. The microactuation system of claim 9 wherein the top electrode comprises:
    a first top electrode element disposed on top of a first longitudinal half of the electroactive element; and a second top electrode element disposed on top of a second longitudinal half of the electroactive element.

11. The microactuation system of claim 2 wherein the bending motor has a length to width ratio of at least about ten.

12. A suspension assembly comprising:

an actuator arm having a proximal end and a distal end;

a load beam attached to the distal end of the actuator arm, the load beam having a mounting region at a proximal end, a head suspension near a distal end of the load beam, and a flexible region between the mounting region and the head suspension;

a flexure configured to support a transducing head;

a beam having a first end and a second end, wherein the first end is connected to the head suspension and the second end is connected to the flexure; and a bending motor attached to a top surface of the beam such that the beam supports the bending motor and transforms a force on the flexure into a compressive load on the bending motor, the bending motor being deformable in response to a control signal applied thereto.

13. The suspension assembly of claim 12 wherein the beam is constructed from steel and has dimensions such that the in-plane resonance frequency of the beam and the distal portion of the head suspension is less than about three kilohertz.

14. The suspension assembly of claim 12 wherein the flexible region of the load beam includes a first flexible beam and a second flexible beam having transverse creases such that the load beam has a first mode out-of-plane resonance frequency of greater than about two kilohertz and a second mode out-of-plane resonance frequency of greater than about six kilohertz.

15. The suspension assembly of claim 12 wherein the bending motor comprises:

a plurality of piezoelectric elements, the piezoelectric elements deformable in response to an applied electric field;

a plurality of first and second top electrodes disposed on a top surface of the plurality of piezoelectric elements;

wherein each set of piezoelectric elements and first and second top electrodes are vertically stacked upon one another.

16. The suspension assembly of claim 15 further comprising:

a first endcap electrically coupled to each of the plurality of first top electrodes;

a second endcap electrically coupled to each of the plurality of second top electrodes.

* * * * *

UNITED STATES PATENT AND TRADEMARK OFFICE
CERTIFICATE OF CORRECTION

PATENT NO. : 6,859,345 B2 Page 1 of 1
DATED : February 22, 2005
INVENTOR(S) : Zine-Eddine Boutaghou et al.

It is certified that error appears in the above-identified patent and that said Letters Patent is hereby corrected as shown below:

Column 12,
Line 9, insert -- , -- after "second end"

Signed and Sealed this

Second Day of August, 2005

JON W. DUDAS
*Director of the United States Patent and Trademark Office*